United States Patent [19]
Roberts et al.

[11] 3,839,823
[45] Oct. 8, 1974

[54] METHOD OF CHEMICALLY INDUCING LIGHTWOOD FORMATION IN PINE TREES

[75] Inventors: Donald R. Roberts, Brooker; William J. Peters, Lake City, both of Fla.; Thaddeus A. Harrington, New Orleans, La.; Junior Broomfield; Ernest R. Crews, both of Olustee, Fla.

[73] Assignee: The United States of America as represented by the Secretary of Agriculture, Washington, D.C.

[22] Filed: Sept. 7, 1973

[21] Appl. No.: 395,025

[52] U.S. Cl............................ 47/10, 47/57.5, 71/94
[51] Int. Cl............................................. A01g 23/10
[58] Field of Search..................... 47/10–12, 57.5; 71/94

[56] References Cited
UNITED STATES PATENTS

| | | | |
|---|---|---|---|
| 2,435,724 | 2/1948 | Ostrom et al. | 47/10 |
| 2,612,000 | 9/1952 | Anderson | 47/10 |
| 3,022,604 | 2/1962 | Greth et al. | 47/10 |
| 3,086,321 | 4/1963 | Wade | 47/10 |
| 3,359,681 | 12/1967 | Clements | 47/10 |

FOREIGN PATENTS OR APPLICATIONS
275,586  10/1970  U.S.S.R.

*Primary Examiner*—Robert E. Bagwill

[57] ABSTRACT

An improved method of inducing lightwood formation (resin soaking) in pine trees resulting in increased deposition of navel stores products within the trees. Lightwood induction is accomplished by treating a small area on the tree with an aqueous chemical solution which moves through the wood causing the ray parenchyma and epithelial cells to release oleoresin from the resin ducts into the tracheids and stimulating increased oleoresin production. These oleoresins are extracted from the trees by known methods and the navel stores products are recovered therefrom.

19 Claims, No Drawings

METHOD OF CHEMICALLY INDUCING LIGHTWOOD FORMATION IN PINE TREES

A nonexclusive, irrevocable, royalty-free license in the invention herein described throughout the world for all purposes of the United States Government, with power to grant sublicenses for such purposes, is hereby given to the Government of the United States of America.

BACKGROUND OF THE INVENTION

1. Field of the Invention:

The invention relates to a new and improved method of chemically inducing the formation of lightwood, rich in oleoresin content, in growing pine trees. The oleoresins are extracted after the trees are harvested and the naval stores products are produced from the extract. This method is particularly applicable to young trees which contain mainly sapwood.

2. Description of the Prior Art:

The production of naval stores products, primarily rosin and turpentine, has been accomplished by four known methods in the past. These include:

a. Induced oleoresin flow from the tree. This method involves inflicting a wound through the bark of the tree. The wound may then be treated with chemical gum flow stimulants. This induces the pine gum, or oleoresin, to slowly exude from humdreds of tiny resin ducts. A cup and gutter system which is attached to the exterior of the tree collects the oleoresin as it flows out of the wound and down the tree. Much manual labor is required to treat a tree to keep the oleoresin flowing, and to collect the oleoresin from the tree.

b. Recovery of sulfate turpentine and tall oil rosin during pinewood pulping. This involves recovering sulfate turpentine from the volatile constituents of the pine chips and removing the tall oil rosin from the cooking liquor during the kraft pulping process. The yield from this method is slight because much of the wood is sapwood which contains only 1 to 5 percent naval stores products.

c. Steam distillation and extraction of the heartwood residue of old longleaf and slash pine stumps. By this method rosin, turpentine, and pine oil are obtained from old growth stumps. These stumps must result from tree harvesting that was done many years before. Additionally, the trees must have been at least a century old when cut. After the trees were cut the sapwood remaining in the stump rotted away leaving the resin-rich heartwood. The heartwood resisted decay, but oxidation and isomerization over many years changed the relative amounts of the individual resin acids and converted much of the terpene hydrocarbon portion into pine oil constituents. Long-leaf and slash pine are now cut young and thus contain very little heartwood. Old stumps are becoming increasingly scarce and failure to replenish the required stump supply discounts this method for the near future.

d. This method can be found in U.S. Pat. No. 2,612,000 (Anderson). Anderson teaches the opening of a deep cut in the bole, preferably into the heartwood, thus rather severely wounding the tree. To induce oleoresin flow, Anderson teaches the use of acidic and caustic chemicals.

Our method of inducing lightwood formation (the deposition of naval stores products within the tree) is a substantial improvement over current methodology because greater quantities of naval stores products are deposited within the trees with a minimal amount of labor and with less expense. The need for cup and gutter apparatus to collect the oleoresin at the exterior of a tree is eliminated. Further, our method eliminates reliance on the fast-disappearing longleaf and slash pine stump supply. The yields available from extractive method (b) above can be greatly increased by practicing our invention as a pretreatment in conjunction with that method. Our invention differs from method (d) in the type of wounding required, the type of chemicals used, and the extent of lightwood formation induced by a single treatment. More particularly, Anderson relies on deep cuts made in the wood. Additionally, he reported effects only within 1 foot above or below the treated area. The method herein described is not so limited. The chemicals we disclose are mobile within the wood and cause lightwood formation wherever they are carried. Our invention thus has greater potential to deposit large amounts of naval stores products with less manual labor. Our method has stimulated lightwood formation 17.5 feet above the point of treatment in slash pine and 30 feet above in longleaf from single applications. Additionally, our method allows large quantities of naval stores products to be deposited within the tree, at will, in the sapwood of actively growing young trees shortly before harvest. Recovery of these products may be accomplished later by the known methods of solvent extraction or steam distillation and solvent extraction.

SUMMARY OF THE INVENTION

The invention discloses a new method of inducing lightwood formation within the sapwood of growing pine trees as a result of appplying an aqueous chemical solution to the living wood xylem. The chemicals used are a class of substituted bipyridylium (bipyridinium) salts, examples of which are shown below:

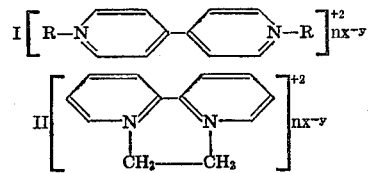

where: $n = 1$ or $2$, $y = 1$ or $2$, and $n \times y = 2$
and, $R = CH_3-$, $CH_3CH_2-$, $CH_3CH_2CH_2-$,

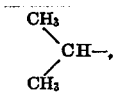

and higher aliphatic alkyl groups, either straight chain or branched; and, $x$ is any anion that makes the compound water soluble such as, but not limited to, the following:

$Cl^-$ (chloride)
$Br^-$ (bromide)
$F^-$ (fluoride)
$I^-$ (iodide)
$SO_4^=$ (sulfate)
$NO_3^-$ (nitrate)
$OH^-$ (hydroxyl)
$CH_3SO_4^-$ (methyl sulfate)

By this method, oleoresins, as a mixture of resin acids and terpene hydrocarbons, are deposited and stored in the tracheids of the wood. After tree harvesting, the oleoresins are extracted and the naval stores products of rosin and turpentine are produced from the extract.

Basically, the solution is absorbed into the ray parenchyma and epithelial cells lining the resin ducts causing them to release oleoresin from the ducts into the tracheids. At the same time the formerly mentioned cells are stimulated to produce and release even more oleoresin so that a large quantity is released into the tracheids. The wood becomes saturated with naval stores products to the extent of 40 to 50 percent of the weight of the lightwood formed. Essentially, this is a method of stimulating internal deposition of oleoresin in the tracheids both near and far from the point of chemical treatment, or introduction, rather than externally collecting oleoresin flow from an area within or near a tree wound where great expenditures of labor are required to both prolong flow and collect the oleoresin.

The chemicals used were previously known only for their herbicidal effects. The solution is simply made by dissolving a proper amount of the chemicals in water. Since some of the chemicals are now commercially available as aqueous herbicidal solutions the only preparation may involve further dilution by the addition of water. The treatment site may be prepared on the tree bole by removing a small section of bark, or by making an axe cut, to expose the sapwood or living xylem, or alternatively, by boring a small downwardly sloping hole into the tree. Other ways of preparing treatment sites may come to mind since the main requirement is to prepare a site in which the solution will contact the wood ray cells. If the former method is used the solution is applied to cover the exposed sapwood or living xylem. The solution is sprayed, poured, or brushed on, or any other method of application may be employed that thoroughly covers the exposed wood to the point of runoff. With the latter site preparation, the solution is simply poured into the hole until it is filled.

Once applied, the chemical becomes quite mobile and may be carried to distant areas within the tree. The chemical continues to form lightwood wherever it is located. Movement is primarily upward and secondarily radial toward the center of the tree. Applications, of course, may be singular with a given tree or may be repeated at various intervals and locations as desired.

Accordingly, an object of this invention is to provide a method of inducing lightwood formation in living pine trees. Another object of the invention is a method by which large quantities of naval stores products are deposited in the sapwood of actively growing young pine trees. Still another object of this invention is the provision of an economical, simple, and quick chemical treatment that induces lightwood formation more effectively than any previously known method. A further object is an improved method of inducing lightwood formation without severely wounding the tree. A final object of the invention is the provision of a method that will increase the harvest of our naval stores natural resources which are increasingly becoming scarce, valuable products.

DESCRIPTION OF THE PREFERRED EMBODIMENTS

In further illustration of this invention, the following examples and information are given:

EXAMPLE I 1-inch-square sections of bark were removed from five locations along the circumference of the lower bole of a slash pine to expose the outermost sapwood at these locations. Each removed section was the same distance up the bole from the base of the tree. Aqueous chemical solutions containing, 0.5, 1.0, 2.0, 4.0, and 8.0 percent 1,1'-dimethyl-4,4'-bipyridylium dichloride, by weight of the cation, were prepared by further diluting the commercially available aqueous herbicidal solution with more water. Each of the five treatment sites was sprayed with a different concentration solution to the point of runoff. Approximately 8 years later, stem cross sections were removed from the treated pine at heights of 5, 10, and 17.5 feet above the point of treatment. The 0.5 and 1.0 percent solution had not induced resin soaking to a height of 5 feet. However, the 2.0 and 4.0 percent solution had. Additionally, the 8.0 percent solution had induced resin soaking to a height of 10 feet and, to a lesser extent, to a height of 17.5 feet. Even at this latter height, the resin soaking extended radially from the exterior of the tree to the heartwood at the center of the tree.

EXAMPLE II

A 1-inch-square section of bark was removed from the lower bole of a longleaf pine to expose the outermost sapwood. An aqueous chemical solution containing 8.0 percent of 1,1'-dimethyl-4,4'-bipyridylium dichloride, by weight of the cation, was prepared by further diluting the already aqueous solution with more water. The treatment site was sprayed with the solution until the sapwood was covered and runoff occurred. Approximately 4 years later, stem cross sections were removed from the treated tree at various heights above the treatment area. It was found that the 8.0 percent chemical solution had induced resin soaking to a height of 30 feet above the application site.

EXAMPLE III

Two treatment areas were prepared by removing part of the bark on opposite sides of a slash pine that was 12 inches diameter at breast height. Each treatment area was approximately 6 inches wide and 1 inch high. One treatment area was sprayed to runoff with a 0.1 percent solution of 1,1'-dimethyl-4,4'-bipyridylium dichloride, by weight of the cation, while the other area was sprayed to runoff with a 50 percent aqueous sulfuric acid solution. These treatments were repeated on fresh wounds directly above the earlier wounds every 2 weeks for a total of 16 treatments. Trunk cross sections were taken a few inches above the treated areas approximately 3-½ years later to compare the depth of resin soaking induced. In the area treated with the inventive method, heavy resin soaking was induced in a pie-shaped wedge area between radial lines from the outside of the treatment area to the heartwood. Resin soaking caused by the acid treatment was less than 0.5 inch deep into the wood.

EXAMPLE IV

A treatment area was prepared by removing a rectangular section of bark approximately 1 inch high and 8 inches wide on each of five longleaf and five slash pine trees. The treatment area was located on the lower bole section of each tree, and equal distance up the bole from the base. The prepared area on each tree was sprayed with an aqueous solution of 0.1 percent 1,1'-dimethyl-4,4'-bipyridylium dichloride, by weight of the cation, beginning in May 1969. The treatment area was sprayed with the solution to the point of runoff. This treatment was repeated on fresh wounds directly above the earlier wounds every 2 weeks for a total of three treatments. In December 1972, two 5-millimeter wood cores were removed from each of five randomly selected trees (three longleaf and two slash pines), one core on each tree coming from an area 5 inches to 20 inches immediately above the treatment site and the other core being removed from an untreated portion of the tree. The naval stores increase was checked by comparing the extractive content of each pair of the cores from each tree. The results are set forth below in Table 1.

TABLE 2

| | Extractives expressed as percent dry weight of wood | |
|---|---|---|
| Tree No. | Untreated area | Treated area |
| 57 | 1.3 | 42.7 |
| 59 | 1.2 | 35.0 |
| 62 | 2.4 | 40.0 |

EXAMPLE VI

We analyzed the extract obtained from resin saturated wood samples of two treated pines, one longleaf treated in Example IV, and one slash treated in Example V, to determine the yield and composition of the extractives and also the rosin characteristics to determine the extractive quality. The results are set forth in Table 3 below.

Table 3

Analysis of 1 kilogram sample of oleoresin saturated wood from two chemically treated pines, one longleaf and one slash, from which cores had previously been removed.

| Species | Yield[1] of extractives (Pct.) | Percent composition of extractives | | Rosin characteristics | | |
|---|---|---|---|---|---|---|
| | | Rosin | Turpentine | Color Grade | A.N.[2] | S.P.[3] |
| Slash No. 57 | 43 | 75 | 25 | WG | 169 | 70° C. |
| Longleaf No. 18 | 42 | 70 | 30 | X+ | 171 | 75° C. |

[1]Percent extractives of dry weight of wood.
[2]Acid number determined by titrating with alkali.
[3]Softening point determined by ASTM ball and ring method.

Table 1

| | | Extractives expressed as percent dry weight of wood | |
|---|---|---|---|
| | Tree No. | Untreated area | Chemically stimulated area |
| Longleaf pine | 11 | 1.1 | 38.3 |
| | 12 | 1.0 | 35.6 |
| | 18 | 0.4 | 38.1 |
| Slash pine | 95 | 1.6 | 48.3 |
| | 99 | 2.2 | 41.1 |

EXAMPLE V

A treatment area was prepared by removing a rectangular section of bark approximately 1 inch high and 6 inches wide on each of a plurality of slash pines. The treatment area on each tree was located on the lower bole section, an equal distance up the bole from the base. The prepared area on each tree was sprayed with an aqueous solution of 0.1 percent 1,1'-dimethyl-4,4'-bipyridylium dichloride, by weight of the cation, beginning in April 1969. Each treatment area was sprayed to runoff. This treatment was repeated on fresh wounds directly above the earlier wounds every 2 weeks for a total of 16 treatments. In December 1972, two 5-millimeter wood cores were removed from each of three randomly selected trees, one core on each tree coming from an area 5 inches to 20 inches immediately above the treatment site and the other core being removed from an untreated portion of the tree. We compared the extractive content of each pair of cores and the results are set forth below in Table 2.

In addition to the examples given, we have also conducted experiments and found our method is very effective with loblolly and sand pine. Although complete data are not yet in, the prospects appear excellent that our treatment will also induce extensive lightwood in most conifers. Since the bark removal method of preparing a treatment site was the method we originally used, only that method is shown in the examples. Nevertheless, it is not necessarily the preferred method since very recent experiments show the same results are possible by drilling a small, let us say 0.5-inch diameter, downwardly sloping hole into the tree, and then filling the hole with the solution. As previously noted, the critical objective is preparing a site within which the solution will contact the wood rays.

Although the data we present reflect the use of a specific chemical solution containing 1,1'-dimethyl-4,4'-bipyridylium dichloride, we have also experimented with solutions of 1,1'-ethylene-2,2'-bipyridylium dibromide and found the results to be substantially the same. For example, various solutions of 1,1'-ethylene-2,2'-bipyridylium dibromide having solution concentrations of from 0.1 to 8.0 percent were introduced into treatment sites in both slash and longleaf pine and were found to induce extensive lightwood formation. More specifically a 2.5 percent concentration solution was introduced into a slash pine and extensive lightwood formation was observed about 4 feet above the treatment site in only 4 weeks. The anions are not critical as long as the substituted bipyridylium salts are water soluble. The percent concentration of the organic salts in the solution was limited in our experiments to a range of from 0.1 percent to 8.0 percent. We believe the 0.1 percent figure may be a practical lower range limit but an upper range limit surely exceeds 8.0 percent. The upper range would only be limited by the tolerance of the chemical in the particular species of tree.

Finally, it is noted that extensive lightwood formation does not require a period of 3½ years or more once our solution has been applied. Recent examination of treated trees indicates the great majority of lightwood formation occurs within 1 year after treatment. Extensive lightwood formation can thus be induced by treating the trees a relatively short time before they are due to be harvested.

These examples show that lightwood can be induced to a substantial height in sample trees by a simple treatment on a small area of the tree. Alternatively, intense resin soaking to the heartwood of a tree can be accomplished with repeated chemical treatments. We feel that half of a tree bole may be resin soaked to a height of 15 feet by one or two well-timed applications of the proper concentration solution. Naval stores production might be increased by up to 20 times the current production rate by using our method.

Having thus disclosed our invention, we claim:

1. An improved method of chemically inducing the deposition of increased quantities of naval stores products within living pine trees by stimulating lightwood formation in large areas of the trees, both near and far from the area of introduction of the chemical, which comprises preparing a small treatment site on the bole of a given tree, introducing an aqueous solution of substituted bipyridylium salt into said treatment site, and permitting said tree to continue to grow for a sufficient period of time to allow the formation of lightwood before harvesting said tree.

2. The method of claim 1 wherein said treatment site is prepared by removing a small portion of bark from the tree to expose the sapwood and said aqueous solution is introduced by spraying, pouring, or brushing it on said sapwood until runoff occurs.

3. The method of claim 2 wherein said aqueous solution comprises from 0.1 to 8.0 percent substituted bipyridylium salt by weight of the cation.

4. The method of claim 3 wherein said substituted bipyridylium salt is 1,1'-dimethyl-4,4'-bipyridylium salt.

5. The method of claim 4 wherein said substituted bipyridylium salt is 1,1'-dimethyl-4,4'-bipyridylium dichloride.

6. The method of claim 3 wherein said substituted bipyridylium salt is 1,1'-ethylene-2,2'-bipyridylium salt.

7. The method of claim 6 wherein said substituted bipyridylium salt is 1,1'-ethylene-2,2'-bipyridylium dibromide.

8. The method of claim 1 wherein said treatment site is prepared by boring a small diameter downwardly sloping hole into said tree and said aqueous solution is introduced by pouring it into said hole until it is filled.

9. The method of claim 8 wherein said aqueous solution comprises from 0.1 to 8.0 percent substituted bipyridylium salt by weight of the cation.

10. The method of claim 9 wherein said substituted bipyridylium salt is 1,1'-dimethyl-4,4'-bipyridylium salt.

11. The method of claim 10 wherein said substituted bipyridylium salt is 1,1'-dimethyl-4,4'-bipyridylium dichloride.

12. The method of claim 9 wherein said substituted bipyridylium salt is 1,1'-ethylene-2,2'-bipyridylium salt.

13. The method of claim 12 wherein said substituted bipyridylium salt is 1,1'-ethylene-2,2'-bipyridylium dibromide.

14. The method of claim 1 wherein said treatment site is prepared by making an axe cut through the bark and said aqueous solution is introduced by filling said cut until runoff occurs.

15. The method of claim 14 wherein said aqueous solution comprises from 0.1 to 8.0 percent substituted bipyridylium salt by weight of the cation.

16. The method of claim 15 wherein said substituted bipyridylium salt is 1,1'-dimethyl-4,4'-bipyridylium salt.

17. The method of claim 16 wherein said substituted bipyridylium salt is 1,1'-dimethyl-4,4'-bipyridylium dichloride.

18. The method of claim 15 wherein said substituted bipyridylium salt is 1,1'-ethylene-2,2'-bipyridylium salt.

19. The method of claim 18 wherein said substituted bipyridylium salt is 1,1'-ethylene-2,2'-bipyridylium dibromide.

* * * * *